US011840326B2

(12) United States Patent
Birkenstock

(10) Patent No.: US 11,840,326 B2
(45) Date of Patent: *Dec. 12, 2023

(54) AIRCRAFT WING WITH SEQUENTIALLY-TIMED BELLOWS ASSEMBLY FOR OPTIMIZING BOUNDARY LAYER CONTROL

(71) Applicant: David Thomas Birkenstock, Herndon, VA (US)

(72) Inventor: David Thomas Birkenstock, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,485

(22) Filed: Sep. 7, 2022

(65) Prior Publication Data

US 2023/0002036 A1 Jan. 5, 2023

Related U.S. Application Data

(63) Continuation of application No. 16/898,939, filed on Jun. 11, 2020, now Pat. No. 11,465,735.

(60) Provisional application No. 62/860,040, filed on Jun. 11, 2019.

(51) Int. Cl.
*B64C 21/02* (2006.01)

(52) U.S. Cl.
CPC .......... *B64C 21/02* (2013.01); *B64C 2230/20* (2013.01)

(58) Field of Classification Search
CPC .. B64C 3/30; B64C 3/46; B64C 21/00; B64C 21/02; B64C 21/025; B64C 2230/20
USPC ........................................................ 244/204
See application file for complete search history.

(56) References Cited

U.S. PATENT DOCUMENTS

| | | |
|---|---|---|
| 2,616,509 A | 11/1952 | Thomas |
| 2,969,211 A | 1/1961 | Von Saurma |
| 2,979,287 A | 4/1961 | Ross |
| 3,106,373 A | 10/1963 | Bain et al. |
| 3,249,327 A | 5/1966 | Smith, Jr. |
| 3,384,183 A | 5/1968 | Braverman |
| 3,463,420 A | 8/1969 | Butler et al. |
| 3,614,260 A | 10/1971 | Ellinger |
| 3,957,232 A | 5/1976 | Sebrell |
| 4,220,109 A | 9/1980 | Cholet |
| 5,358,200 A | 10/1994 | Onda |
| 7,686,257 B2 | 3/2010 | Saddoughi et al. |
| 7,967,258 B2 | 6/2011 | Smith et al. |
| 8,348,200 B2 | 1/2013 | Saddoughi et al. |
| 9,512,821 B2 | 12/2016 | Baruzzini et al. |

(Continued)

FOREIGN PATENT DOCUMENTS

| | | |
|---|---|---|
| GB | 568910 A | 4/1945 |
| GB | 1144231 A | 3/1969 |
| WO | 2010/115876 A1 | 10/2010 |

OTHER PUBLICATIONS

Notification of Transmittal of the International Search Report and the Written Opinion of the International Searching Authority dated Aug. 31, 2020, in connection with corresponding international Application No. PCT/US20/37215 (9 pp.).

*Primary Examiner* — Brady W Frazier
(74) *Attorney, Agent, or Firm* — Maier & Maier, PLLC

(57) ABSTRACT

Methods for optimizing Boundary Layer Control (BLC) systems and related systems (e.g. a Laminar Flow Control (LFC) system or systems, a Static Pressure Thrust (SPT) system or systems, a Boundary Layer Ingestion (BLI)/Wake Immersed Propulsion (WIP) system or systems, and/or low-dissipation BLC fluid-movement system or systems) to operate in concert with each other and a bellows air-moving system are disclosed.

5 Claims, 5 Drawing Sheets

(56) References Cited

U.S. PATENT DOCUMENTS

| | | |
|---|---|---|
| 10,968,887 B2 | 4/2021 | Akay et al. |
| 2002/0195526 A1 | 12/2002 | Barrett et al. |
| 2009/0076787 A1 | 3/2009 | Birkenstock |
| 2009/0194640 A1 | 8/2009 | Birkenstock |
| 2009/0289150 A1 | 11/2009 | Birkenstock |
| 2011/0198444 A1 | 8/2011 | Dong |

Area of favorable pressure gradient 60

AIRCRAFT WING WITH SEQUENTIALLY-TIMED BELLOWS ASSEMBLY FOR OPTIMIZING BOUNDARY LAYER CONTROL

CROSS-REFERENCE TO RELATED APPLICATIONS

The present patent application is a continuation of U.S. application Ser. No. 16/898,939, filed Jun. 11, 2020, which claims benefit and priority to U.S. Provisional Patent Application No. 62/860,040, filed Jun. 11, 2019, which is hereby incorporated by reference into the present disclosure.

FIELD

Exemplary embodiments relate generally to Boundary Layer Control (BLC) systems, suction-stabilized Laminar Flow Control (LFC) systems, Static Pressure Thrust (SPT) systems, low-dissipation BLC fluid-movement mechanisms, Boundary Layer Ingestion (BLI)/Wake Immersed Propulsion (WIP) systems and to methods for combining such advances into a system with greater performance than systems without these inventions. LFC, SPT, WIP and a Bellows-type of air moving mechanism are concepts that are known to persons skilled in those arts.

BACKGROUND

The general concept of Boundary Layer Control (BLC) is known in the fluid mechanics and aircraft design arts and can be used to achieve increased performance. Boundary Layer Control can be used to maintain a fluid dynamic phenomenon called Laminar Flow. Laminar flow boundary layers create much lower drag than turbulent flow boundary layers. This is well known in the arts of fluid mechanics and aircraft design. The subject of Boundary Layer Control suction for active Laminar Flow Control (LFC) is discussed in this overview: Braslow, Albert L., "A History of Suction-Type Laminar-Flow Control with Emphasis on Flight Research," Monographs in Aerospace History, No. 13, 1999, the contents of which are hereby incorporated by reference in their entirety. Additional documentation concerning the Boundary Layer Control can be found in Thwaites, Brian, Incompressible Aerodynamics, ISBN-10:0486654656, the contents of which are hereby incorporated by reference in their entirety. Further, U.S. Patent Publication No. 20080023590 shows BLC and suction-stabilized laminar flow control and is hereby incorporated by reference in its entirety. Similarly, U.S. Pat. Nos. 2,833,492 and 2,646,945 show related art and are hereby incorporated by reference in their entirety. Static Pressure Thrust (SPT) is a fluid-dynamic phenomenon that is known in the fluid dynamic arts. Discussion & documentation concerning SPT can be found in Goldschmied, F. R., FUSELAGE SELF-PROPULSION BY STATIC-PRESSURE THRUST: WIND-TUNNEL VERIFICATION, AIAA paper #87-2935, U.S. Pat. No. 8,113,466B2 and Carmichael, B, Personal Aircraft Drag Reduction, 1995, Published by the author, the contents of which are hereby incorporated by reference in their entirety. Aerodynamic flows are described in Power Balance in Aerodynamic Flows by Drela, Mark. AIAA Journal, vol. 47, issue 7, pp. 1761-1771, hereby incorporated by reference in its entirety.

Wake Immersed Propulsion (WIP) is also known in the vehicle design arts. The vast majority of surface shipping motor vessels were designed so that during normal operation the main propellers are immersed in the wake of the ship. The increase in propulsive efficiency of this configuration over designs without WIP is well documented and understood.

BLC, LFC and related specialties can be grouped under the category of "open-thermodynamic" (open-thermo) aircraft design, where energy use and external (e.g.; airframe) geometry are designed around each other from the earliest stages of design. For comparison, a 'closed-thermo' design is what typical airliner designs employ, the airframe and power use are mostly independent of each other, not optimized to exploit the synergy between the two. This open-thermo design philosophy has been investigated in multiple research and development programs, which have delivered meaningful benefits from a fluid-dynamics perspective. Some of these designs have suffered clogging problems from debris, dust, dirt, etc. which causes operational expenses to increase due to frequent cleaning requirements.

Despite significant benefits, these increased costs have limited the benefit of open-thermo designs to 'real-world' operation like airline service to a prohibitive degree. If the benefits of open-thermo designs can be brought into 'real-world' operations, significant increases in performance can be delivered to operators and their customers. Additionally, if the operating energy demands of these systems can be further reduced, significant increases in performance can be created. Accordingly, there is a clearly felt need in the art for a system and method for combining BLC, e.g. LFC, BLIMP & SPT systems, to work in concert with each other, which allows resulting vehicles to deliver greater performance (e.g. efficiency) than vehicles designed around legacy propulsion. If a way that keeps related cleaning and operational costs low enough to not outweigh the benefits can be optimized, these benefits can be brought to 'real-world' air travel service.

SUMMARY

Bellows-powered BLC, for reduced dissipation in the BLC system may be implemented in an exemplary embodiment. Bellows and similar fluid-moving mechanisms are known to persons skilled in the art of building such mechanisms as an accordion musical instrument, designing an air-movement mechanism for use in the workshop of a blacksmith or other similar mechanisms. Boundary Layer Control (BLC), is likewise known in the arts of fluid mechanics and aircraft design.

An exemplary embodiment combines these two previously independent specialties and in doing so, creates a significant leap in the performance (e.g. efficiency) of aircraft designed around this synergistic interaction of BLC and improved BLC air management system.

An exemplary bellows-based BLC air management system may provide the same pressure differential and flow-rate of traditional compressor or fan-based BLC air moving systems, with lower dissipation or energy consumption (frequently called 'drag') and, therefore, better performance.

For an aircraft designed to exploit BLC and suction-stabilized Laminar Flow, great leaps in performance can be created. When comparing a modified airfoil to a natural laminar flow airfoil the effective upper surface drag coefficient is about 29% that of an upper surface drag coefficient of the best natural laminar flow section measured to date. The power consumption of the resulting aircraft component is found "to be wake drag 28% and suction drag 72%," (Carmichael, B, Personal Aircraft Drag Reduction, Third Edition, page 97.)

For an exemplary aircraft designed to exploit suction-stabilized Laminar Flow and the improved BLC air movement mechanism of an exemplary bellows architecture, a significant reduction in power required for flight, in addition to the power savings due to Laminar Flow, can be created by leveraging the reduced dissipation of a bellows-based BLC air moving mechanism.

This enables a significant reduction in total power required for aircraft designed and built around this propulsion architecture. As an example, a Solar powered High Altitude Long Endurance aircraft can be optimized to have a wing design with a significantly greater chord length than that of legacy state-of-the-art designs like those of Google/Titan Aerospace, the Facebook 'Aquila', the Boeing Odysseus, the Airbus Zephyr, and others, without the unacceptably large energy consumption that traditional aircraft architectures would create. This allows far greater surface area without unacceptably large areas of turbulent flow, which in turn allows for significantly greater performance.

This LFC, BLC, and bellows architecture, in combination with external and internal aerodynamic geometries optimized to exploit Static Pressure Thrust can create still-better performance than aircraft designs that simply combine Laminar Flow, stabilized by BLC with reduced dissipation of a bellows air-mover.

The addition of SPT to an exemplary architecture allows performance greater than what is predicted. In FIG. 55, Carmichael, B, Personal Aircraft Drag Reduction, Page 74, for each thickness of airfoil design the chart shows minimum drag values that increase with increasing Reynolds Numbers. This is correct for legacy airfoil designs, as above this Reynolds Number value, the BLC system begins to create pressure drag on the aft-facing convex curve. Adding SPT to such an airfoil may allow greater efficiency even for designs (airfoils, aircraft fuselages, etc.) of significantly greater length that what can be optimized using legacy technology. This is because even for a body of outrageously long length, the combination of convex geometry, BLC and concave geometry that make up a SPT assembly will prevent pressure drag from causing inefficiency, which allows the system to be fully optimized.

Similarly, the above combination of BLC plus bellows architecture plus SPT, can be improved by incorporating the concept of Wake Immersed Propulsion (WIP). An exemplary LFC+BLC+bellows architecture+SPT+Wake Immersed Propulsion, can create even-better performance (e.g. efficiency) than an LFC+BLC+bellows architecture.

An exemplary embodiment may implement Oversized BLC Ducting. The nature of boundary layers in pipes and on the internal walls of ducts is known in the arts of fluid mechanics. For example, increasing the size of a duct will reduce the energy losses in this boundary layer and decrease the speed of the air moving through the duct, if all else is kept equal.

By optimizing the fluid-flow properties inside the ducting of a BLC system in this way, the optimization of these oversized BLC ducts in combination with external and internal aerodynamic geometries optimized for use with Boundary Layer Control to exploit Static Pressure Thrust can create a system with greater performance (e.g. lower energy consumption) that that of a legacy system.

As another example, VTOL transports such as the Uber eCRM-series of aircraft can be made to be wider, for increased passenger comfort, and more energy efficient thanks to this combination of Oversized internal BLC ducting and SPT. This combination creates performance not possible from legacy propulsion technologies.

By combining LFC+SPT+Oversized internal ducting, still-better performance (e.g. efficiency) can be created by optimizing the internal aerodynamics, the resulting body will be wider than an otherwise-optimized aerodynamic body, but exploiting SPT allows this configuration to be more efficient than legacy designs, which, in turn, allows for still-larger internal ducting with less internal losses.

Efficiency can also be improved by combining LFC+SPT+Oversized internal ducting+Wake Immersed Propulsion, even-better performance (e.g. efficiency) than LFC+SPT+Oversized internal ducting can be created.

Laminar Cascade Propulsion may be combined with SPT and/or BLIMP. An exemplary embodiment provides a system and method for optimizing the combination of BLC, e.g. LFC, SPT and/or BLIMP systems, to work in concert with the geometry of the vehicle. For example, this represents a propulsion paradigm that can enable aircraft of far greater performance than what is possible using legacy propulsion.

The laws of fluid mechanics present meaningful limitations and constraints. For example, the nature of laminar boundary layers is closely tied to the Reynolds number of that flow. Laminar flow is only possible at relatively low Reynolds numbers. For a typical transport aircraft, the combination of reference length and airspeed create Reynolds numbers high enough that laminar flow is not possible. In contrast to this, an exemplary embodiment presents a way to reset the local Reynolds number, therefore disconnecting it from the length of the body so that the resulting aircraft can be surrounded by laminar flow even in areas where the length of the body and the airspeed would otherwise prevent laminar flow. This is possible because the BLC inlet serves to reset the local Reynolds number so that the laws of fluid mechanics remain unbroken and yet are no longer so limiting, due to the ability of designers to use this to their advantage. The combination of LFC, SPT, and/or WIP installations being designed in series, or daisy-chained, or in a cascade arrangement in this manner can be called Laminar Cascade Propulsion.

Accordingly, an exemplary embodiment may provide a system and method for combining this Laminar Cascade Propulsion (LCP) with Static Pressure Thrust that will allow the aircraft designed around this propulsion concept to deliver performance greater than what is possible from legacy propulsion.

The concept of Laminar Flow is known in the arts of fluid mechanics and aircraft design. In Personal Aircraft Drag Reduction, Third Edition, Bruce Carmichael writes about a series or 'cascade' of BLC inlets combined with surface geometry optimized to create and maintain laminar flow on the wings of an F-94 Jet aircraft.

By combining these benefits with external and internal aerodynamic geometries optimized for use with Boundary Layer Control to exploit Static Pressure Thrust increased performance is enabled.

By further combining the above in addition to Wake Immersed Propulsion, still-greater advances in aircraft performance are enabled.

An exemplary embodiment may implement Imperfection Tolerance. The recipe for creating and maintaining laminar flow across different structures is well known to those skilled in the aircraft design arts, for example. The cleanliness needed of these structures is based on the behavior of laminar flow across a flat plate while the outer surface of most aero structures is convex, which accelerates the local airflow and creates a favorable pressure gradient.

Designers can exploit this favorable pressure gradient, e.g., optimize the nature of the convex-curved fuselage outer skin, and therefore the pressure gradient across that structure, to tolerate surface imperfections that would prevent laminar flow on a flat plate, so flow targets are met on the convex aero structure.

If a flat plate, which has relatively little favorable pressure gradient, requires a certain amount of perfection, then a convex-curved fuselage, which can be engineered to have a sufficiently favorable pressure gradient would require less perfection thanks to that favorable pressure gradient.

This allows a vehicle outer structure with real imperfections, e.g. enough imperfections to prevent laminar flow on a flat plate, to create and maintain laminar flow in real-world operations. This enables a relatively fast and imperfect cleaning event to suffice in achieving laminar airflow targets in day-to-day revenue air transport service, which allows for acceptably short turn-around times for commercial transport operations like an urban air taxi or airline service.

This becomes increasingly attractive to aircraft designers when combined with geometries optimized for Static Pressure Thrust, which, by their nature are more convex than those not optimized for SPT.

These and additional objects, advantages, features and benefits of the present inventions will become apparent from the following disclosure.

BRIEF DESCRIPTION OF THE DRAWINGS

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Figure 1:
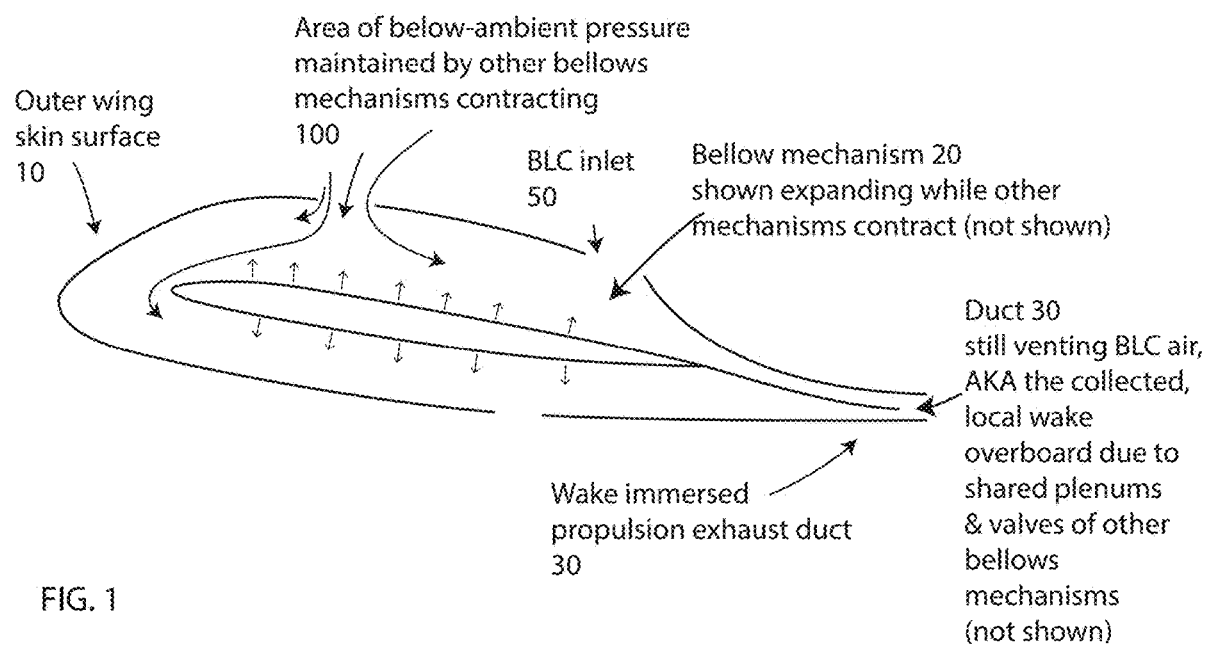
FIG. 1 is an exemplary diagram representing a side view look at a body designed to benefit from this bellows-based BLC air moving mechanism.

FIG. 1 is an exemplary diagram representing a side look at a body designed to benefit from this bellows-based BLC air moving mechanism with bellows mechanism 20, shown expanding. This exemplary embodiment shows outer wing skin surface 10, BLC inlet 50, area of below-ambient pressure 100 (in this case being maintained by bellows mechanism 20, which is contracting elsewhere not shown), bellows mechanism 20, which is shown expanding, and Wake Immersed Propulsion duct 30. This WIP exhaust duct 30, is shown still venting BLC air, also known as the collected & accelerated local wake, overboard out the exhaust duct 30, due to shared plenums & valves of other bellows mechanisms, which are not shown.

Figure 2:
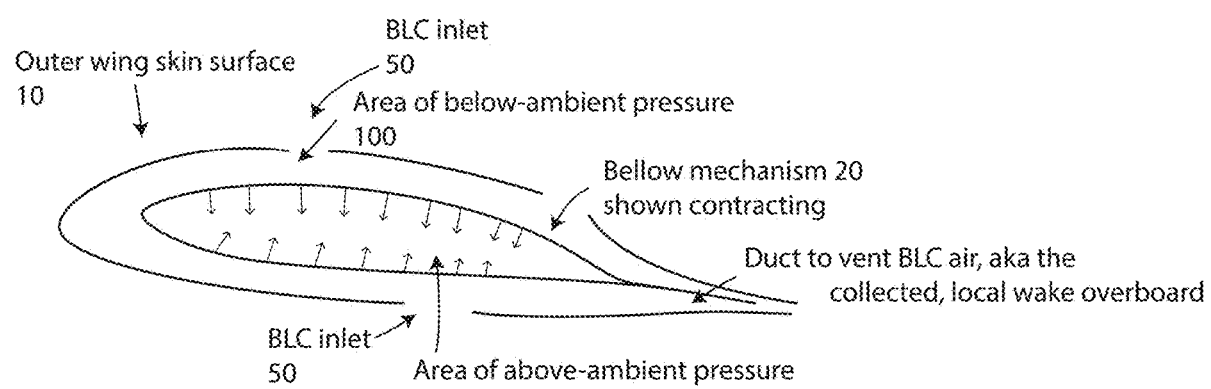
FIG. 2 is an exemplary diagram representing a side view look at a body designed to benefit from a bellows-based BLC air moving mechanism.

FIG. 2 is an exemplary diagram representing a side view look at a body designed to benefit from an exemplary bellows-based BLC air moving mechanism with bellows mechanism 20, shown contracting. These assemblies can be optimized to operate in concert with each other, so that the combined systematic, sequentially-operating collection of components create and maintain the pressure differential and air flow rate required to achieve the overall goals (e.g., increased areas of laminar flow, areas of Static Pressure Thrust, etc.). This exemplary embodiment shows outer wing skin surface 10, BLC inlet 50, area of below-ambient pressure 100 (in this case being maintained by bellows mechanism 20, which is contracting as shown), bellows mechanism 20, which is shown contracting, and WIP exhaust duct 30. This WIP exhaust duct 30, can vent BLC air, also known as the collected & accelerated local wake, overboard out of the exhaust duct 30, across the trailing edge of the wing due to shared plenums & valves of other bellows mechanisms, which are not shown.

These assemblies can be optimized to operate in concert with each other, so that the combined systematic, sequentially-operating collection of components create and maintain the pressure differential and air flow rate required to achieve the overall goals (e.g., increased areas of laminar flow, areas of Static Pressure Thrust, etc.).

Figure 3:
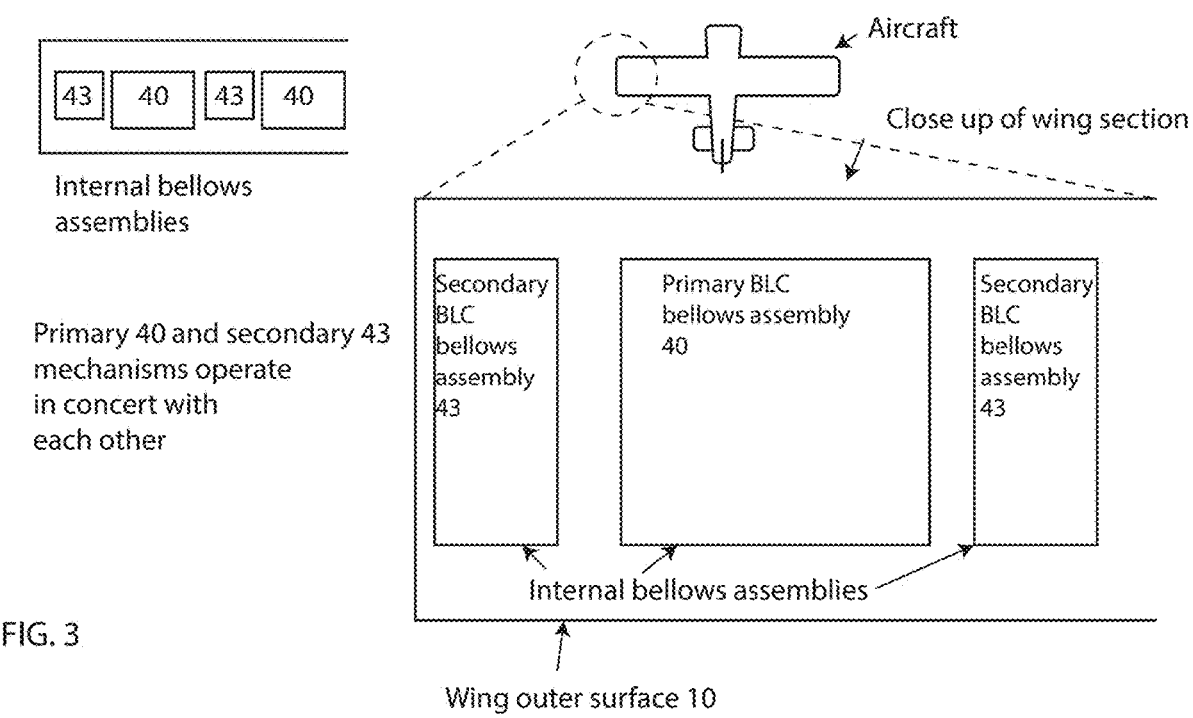
FIG. 3 is an exemplary diagram representing a top-down look at a body designed to benefit from a bellows-based BLC architecture.

FIG. 3 is an exemplary diagram representing a top-down look at a body designed to benefit from an exemplary bellows-based BLC architecture using primary internal bellows assembly 40, and secondary internal bellows assembly 43. This exemplary embodiment shows primary internal bellows assembly 40, and secondary internal bellows assembly 43.

FIG. 3 shows outer wing skin 10, Primary Bellows Mechanism 40, and Secondary Bellows Mechanism 43. Primary mechanism 40, and Secondary mechanism 43, and the like may be optimized to operate in concert with each other, so that the combined systematic, sequentially-operating collection of components create and maintain the pressure differential and air flow rate required to achieve the overall goals (e.g., increased areas of laminar flow, areas of Static Pressure Thrust, etc.).

These mechanisms and the like can be optimized to operate in concert with each other, so that the combined systematic, sequentially-operating collection of components create and maintain the pressure differential and air flow rate required to achieve the system design goals (e.g., increased areas of laminar flow, areas of Static Pressure Thrust, etc.).

In one exemplary embodiment, the BLC apparatus may be switched off or even operated with flow in the opposite direction from normal as a way to manage aircraft energy state. For example, if the aircraft needed to make an emergency descent, turning off the BLC system will greatly increase drag and will increase descent rate accordingly.

Figure 4:
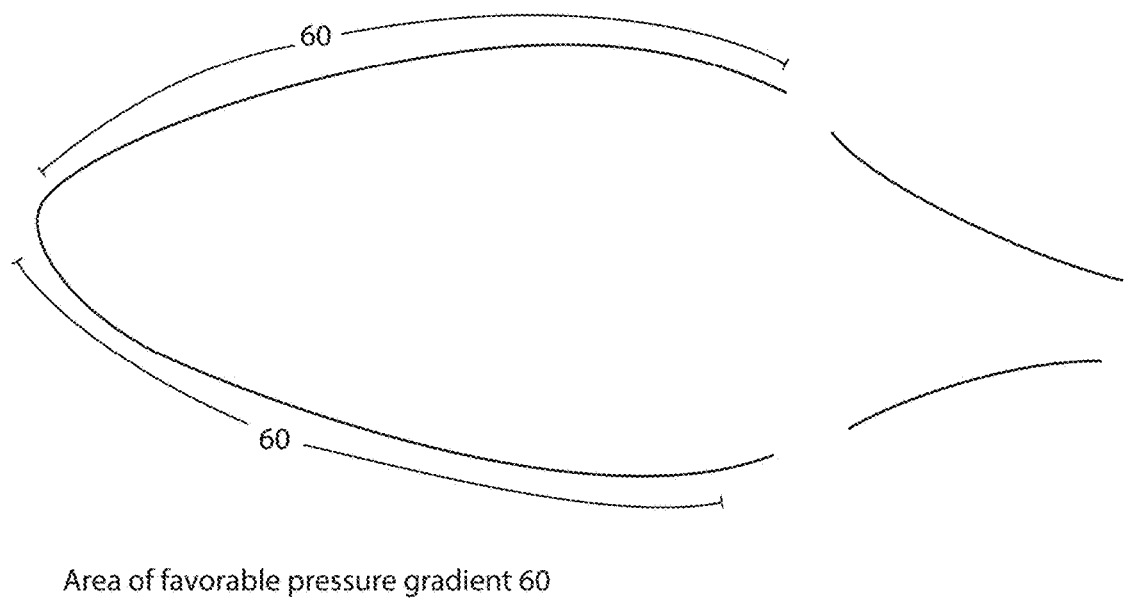
FIG. 4 is an exemplary diagram representing a cross-section of a body designed to benefit from increased imperfection tolerance, showing area of favorable pressure gradient.

Referring now to FIG. 4, FIG. 4 is an exemplary diagram representing a cross-section of a body designed to benefit from increased imperfection tolerance, showing area of favorable pressure gradient 60. By creating a body that is wider than typical aerodynamic bodies, the local pressure gradient is made more favorable to laminar flow and flow relaminarization. This geometry will allow for surface roughness, waviness, debris contamination and other surface imperfections that would prevent laminar flow across body geometry without such a favorable pressure gradient.

In one exemplary embodiment, an air taxi aircraft can be flown with laminar boundary layers covering its external geometry despite having surface imperfections (caused by bugs, debris, gaps, deformities, defects, etc.) that would prevent laminar flow on bodies without such a favorable pressure gradient.

Figure 5:
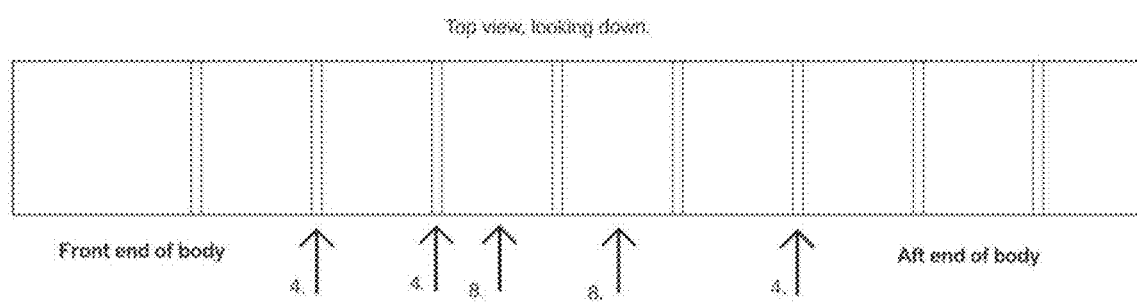
FIG. 5 is an exemplary diagram representing a top-down look at a body designed to benefit from Laminar Cascade Propulsion

Referring now to FIG. 5, FIG. 5 is an exemplary diagram representing a top-down look at a body designed to benefit from Laminar Cascade Propulsion. In this example the body can be an airfoil or fuselage or other body designed for aerodynamic efficiency. The airflow is from left to right and the BLC inlet or inlets 4, are located near an area designed for laminar flow 8. The series, daisy chain or cascade of laminar flow areas 8, can be placed in multiple locations over the body so that the maximum possible surface area of that body can be covered by laminar flow.

Figure 6:
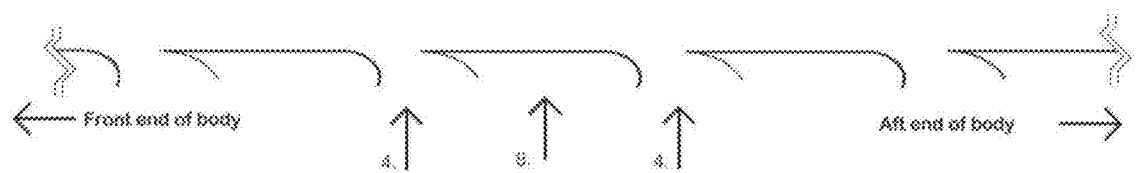
FIG. 6 is an exemplary diagram representing a close-up view of the external surface of a body designed to benefit from Laminar Cascade Propulsion.

FIG. 6 is an exemplary diagram representing a close-up view of an external surface of a body designed to benefit from Laminar Cascade Propulsion (LCP). In this example the body can be an airfoil, fuselage, or other body designed for aerodynamic efficiency. As with FIG. 5, the airflow is from left to right and the BLC inlet(s) 4, are positioned to aid in the creation and maintenance of laminar flow over the external surface areas engineered for laminar flow 8.

The length of laminar flow area 8, will be limited by the local Reynolds number, which will relate to the transition of the flow from laminar to turbulent just as it does on non-BLC designs. This fact does not limit the percentage of the body that can be covered by laminar flow, the Reynolds number limit only limits the length of the area engineered to create and maintain laminar flow 8. For example, even an aircraft fuselage or wing chord of absurdly long length can be made to create and maintain laminar flow over a large majority of its external surface area, as long as the designers limit the length of the area engineered to create and maintain laminar flow 8, to respect the limiting local Reynolds number. The series, daisy chain or cascade of BLC inlet(s) 4, and laminar flow area(s) 8, work together to extend the benefits of laminar flow to bodies of functionally unlimited length.

By installing LCP systems in this way and optimizing the local geometry to benefit from the series, daisy chain or cascade of LFC systems, the entire combination of LFC systems and related external geometry can be optimized for any particular operational goal.

The number of LFC systems in the cascade will depend on the goals of the designer. For a Solar powered High-Altitude Long Endurance telecommunications aircraft, the goal might be 100% of the airframe covered in Laminar flow maintained by this LFC cascade. Conversely, some airliner designs are unlikely to enjoy Laminar flow over the cockpit windows and other airframe imperfections, so those designs may not be able to have 100% laminar flow. Those designs will need the LFC cascade to be designed for these airframe imperfections, so that the LFC cascade can create Laminar flow in the areas downstream of the imperfections. For example, if the immediate downstream result of a cockpit window is significantly thicker boundary layer, the BLC/LFC system will need to be designed for that specific flow condition, if only in the immediate area of the thicker boundary layer.

The benefit of greatly increased laminar flow area may be so large that aircraft performance might be high enough that WIP is not needed and the BLC air is not re-accelerated to flying speed like it is in a WIP configuration.

Figure 7:
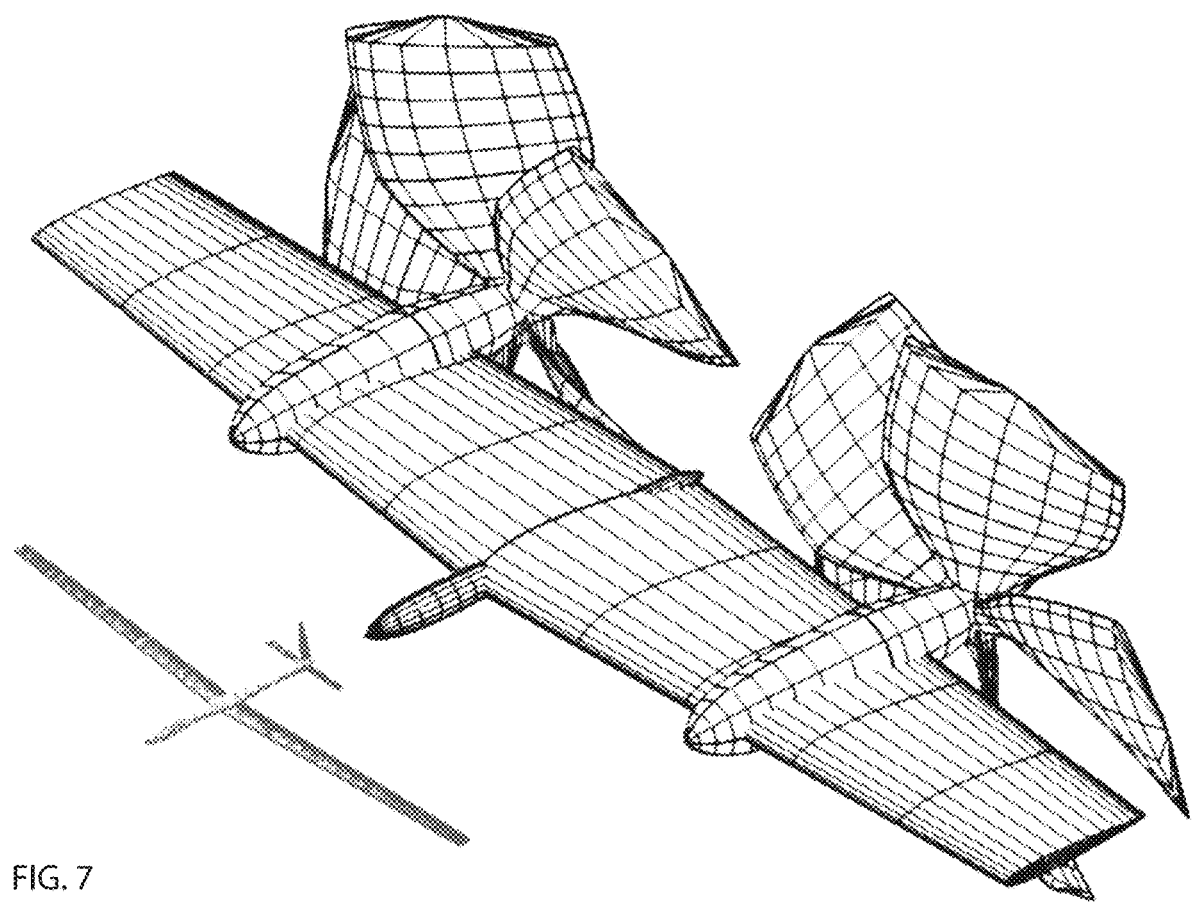
FIG. 7 is an exemplary diagram representing an isometric perspective of a legacy Solar powered High Altitude Long Endurance (HALE) aircraft on the left side and the aircraft on the right side is a much larger Solar HALE aircraft which has been designed to exploit Laminar Cascade Propulsion, Static Pressure Thrust, the low-dissipation BLC fluid-movement mechanism disclosed here and related advances.

In yet another exemplary embodiment, the present invention can be used to enable much better propellers. For example, the oversized airfoils used in the larger Solar HALE aircraft on the right in FIG. 7 can be made significantly more efficient by using an exemplary embodiment. The resulting Solar HALE aircraft may have performance superior to that of the legacy design, which is shown on the left side of FIG. 7.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention.

What is claimed is:

1. An aircraft wing with a system for optimizing boundary layer control, comprising:
   an enclosing structure having a leading edge, a trailing edge, a first wing portion extending between the leading edge and the trailing edge, and a second wing portion extending between the leading edge and the trailing edge and disposed opposite the first wing portion;
   an inner cavity defined within the enclosing structure;
   at least one bellows assembly disposed in the inner cavity and including at least one primary bellows and at least one secondary bellows operating in a sequentially-timed manner with the primary bellows;
   wherein the at least one bellows assembly is spaced apart from inner surfaces of the leading edge, the trailing edge, the first wing portion, and the second wing portion so as to define a void between the at least one bellows assembly and the inner surfaces;
   a first boundary control inlet defined in the first wing portion and in communication with the void; and
   a second boundary control inlet defined in the second wing portion and in communication with the void.

2. The aircraft wing of claim 1, further comprising at least one further boundary control inlet defined in the first wing portion and in communication with the void.

3. The aircraft wing of claim 1, further comprising a series of boundary control inlets defined in the first wing portion and in communication with the void.

4. The aircraft wing of claim 2, wherein the at least one further boundary control inlet is arranged rearwardly of the first boundary control inlet and aligned, in a chordwise direction of the wing, with the first boundary control inlet.

5. The aircraft wing of claim 3, wherein the series of boundary control inlets is arranged rearwardly of the first boundary control inlet and aligned, in a chordwise direction of the wing, with the first boundary control inlet; and
   wherein the boundary control inlets of the series of boundary control inlets are arranged in a front-aft direction of the wing and aligned in the chordwise direction of the wing.

\* \* \* \* \*